(No Model.)

J. D. REEKIE.
BLOCK CUTTING MACHINE.

No. 417,367. Patented Dec. 17, 1889.

Witnesses:
C. E. Bostwick
R. S. Borland

Inventor:
James D. Reekie

UNITED STATES PATENT OFFICE.

JAMES D. REEKIE, OF DULUTH, MINNESOTA.

BLOCK-CUTTING MACHINE.

SPECIFICATION forming part of Letters Patent No. 417,367, dated December 17, 1889.

Application filed March 11, 1889. Serial No. 302,925. (No model.)

*To all whom it may concern:*

Be it known that I, JAMES D. REEKIE, a citizen of the United States, residing at Duluth, in the county of St. Louis and State of Minnesota, have invented certain new and useful Improvements in a Block-Cutting Machine; and I do hereby declare the following to be a full, clear, and exact description of the invention, such as will enable others skilled in the art to which it appertains to make and use the same.

My invention relates to a machine for cutting blocks for street-paving, &c.; and it has for its object to provide a simple, cheap, and efficient block-cutting machine which will be easy to manipulate and so constructed, with an inclined carriage swinging below the center of the saws, that they when cutting tend toward holding the stick that is being cut in place.

To this end my invention consists in the peculiar construction and combination of parts as will be hereinafter fully described, and particularly pointed out in the claim, reference being had to the accompanying drawings in which—

Figure 2:
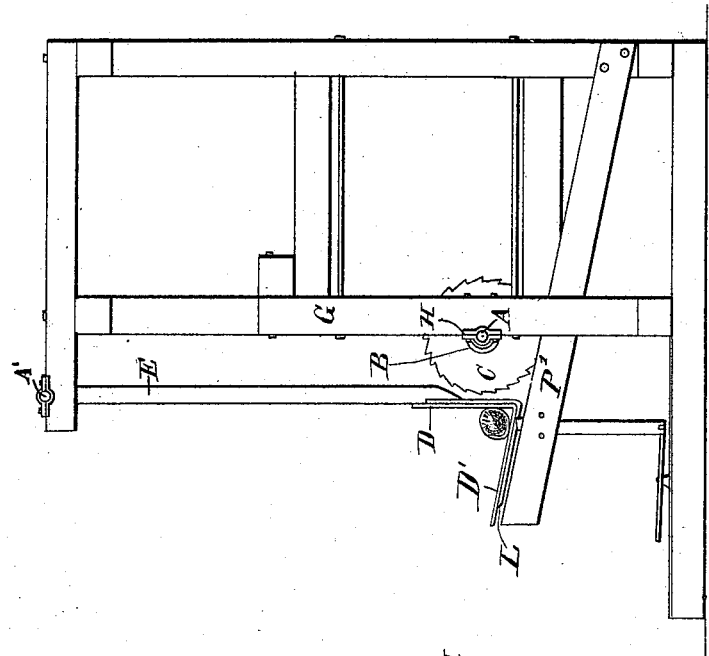
Figure 1:
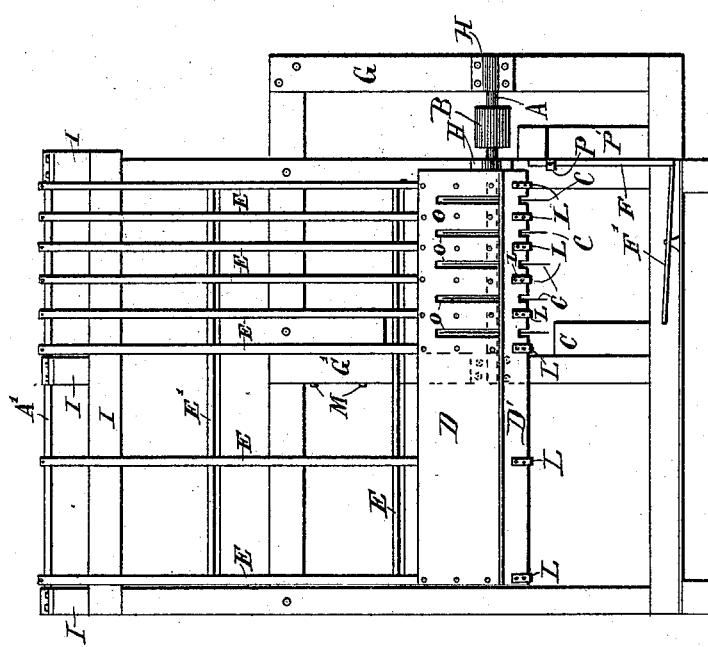

Figure 1 is a front elevation, and Fig. 2 is a side elevation.

In the drawings, A denotes the saw-arbor, on which is mounted and securely fastened thereto any desired number of circular saws C, said arbor to be mounted on the frame G G', as shown; and B is a pulley by means of which the arbor or shaft A is revolved, the part of the frame lettered G' being movable by means of the bolts M, thereby allowing the saws to be taken off without removing the caps H.

D D' is the carrriage, which is securely fastened to the swinging frame E E' by means of the metallic straps L, said frame hung from the shaft A', journaled on the upper part of the frame I I', the outwardly-extending portion D' of the carriage D D' to be inclined upward in such a position as to keep the stick that is being cut in the lowest part thereof, and also to prevent it jumping back when pushed against the saws.

F is the bumper, operated by the foot-lever F', said bumper being so arranged that the operator may raise the upright piece F by applying his foot to the lever F', and thereby prevent the stick that is being cut from passing the end of the carriage when pushed endwise on it ready for another cut, the bumper being held in position by the strap P, which is securely fastened to the timber P'.

The carriage D D' is provided with a slot Q directly in front of each saw, to permit the same to pass through them when the carriage is pushed forward to make a cut.

The operation of my invention is as follows: The stick which is to be cut having been properly placed on the swinging carriage and the saws set in motion, the carriage is pushed forward against the saws, each one coming through its respective slot in the carriage and cutting through the stick. Then the carriage is swung back and the stick pushed endwise until all the cut blocks drop off and it is stopped by the bumper, which is operated by the foot, when it is then ready for another cut.

From the foregoing description, taken in connection with the drawings, the operation and advantages of my invention will readily be understood.

Having thus described my invention, what I claim, and desire to secure by Letters Patent, is—

In a block-cutting machine, the combination of a swinging frame E E', a carriage D D', having an inclined bottom arranged to swing below the center of the saws C, of the arbor A, a shaft A', the slots O, and the straps L, the bumper F, the lever F', the strap P, and the timber P', all substantially as and for the purpose specified.

In testimony whereof I affix my signature in presence of two witnesses.

JAMES D. REEKIE.

Witnesses:
   S. G. STEVENS,
   J. H. LOGIE.